(12) United States Patent
Liu et al.

(10) Patent No.: US 11,893,222 B2
(45) Date of Patent: Feb. 6, 2024

(54) AUTOMATICALLY SCALING TREND CHART GRAPHICAL DISPLAY GENERATION IN A TOXIC GAS MONITORING SYSTEM

(71) Applicant: Honeywell International Inc., Charlotte, NC (US)

(72) Inventors: Yi Liu, Marietta, GA (US); DongHeon Shin, Buffalo Grove, IL (US); Fox Alexander Kiester, Johns Creek, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/804,432

(22) Filed: May 27, 2022

(65) Prior Publication Data

US 2023/0384921 A1    Nov. 30, 2023

(51) Int. Cl.
| | |
|---|---|
| *G06F 3/04847* | (2022.01) |
| *G06F 3/04842* | (2022.01) |
| *G06T 11/20* | (2006.01) |
| *G06F 16/26* | (2019.01) |
| *G06F 16/248* | (2019.01) |
| *G06F 16/242* | (2019.01) |

(52) U.S. Cl.
CPC ...... *G06F 3/04847* (2013.01); *G06F 3/04842* (2013.01); *G06F 16/248* (2019.01); *G06F 16/2428* (2019.01); *G06F 16/26* (2019.01); *G06T 11/206* (2013.01); *G06F 2203/04806* (2013.01)

(58) Field of Classification Search
CPC ............... G06F 16/248; G06F 16/2428; G06F 3/04842; G06F 16/26; G06F 3/04847; G06F 2203/04806; G06T 11/206
See application file for complete search history.

(56) References Cited

U.S. PATENT DOCUMENTS

| | | |
|---|---|---|
| 10,649,449 B2 | 5/2020 | Bell et al. |
| 2007/0285426 A1 | 12/2007 | Matina |

(Continued)

OTHER PUBLICATIONS

"BGA244 Binary Gas Analyzer," User Manual, Stanford Research Systems, 298 pgs, (2016-2018).

(Continued)

*Primary Examiner* — Justin R. Blaufeld
(74) *Attorney, Agent, or Firm* — Alston & Bird LLP

(57) ABSTRACT

Methods, apparatuses, and systems that cause rendering of a gas concentration trend chart user interface on a display is provided. The gas concentration trend chart user interface includes a gas concentration data point graphic section configured to display a first data set in an hourly mode, a left graphic slider user interface element, and a right graphic slider user interface element. A first user interaction input causing a reduced graphic distance between the left graphic slider user interface element and the right graphic slider user interface element is received and identified. The reduced graphic distance is determined to satisfy a minute mode triggering distance threshold and in response to determining that the reduced graphic distance satisfies the minute mode triggering distance threshold, the gas concentration data point graphic section is caused to display a second data set in a minute mode.

12 Claims, 7 Drawing Sheets

(56) References Cited

U.S. PATENT DOCUMENTS

| | | | |
|---|---|---|---|
| 2008/0172630 A1* | 7/2008 | Dang | G06T 11/206 |
| | | | 715/771 |
| 2010/0231595 A1* | 9/2010 | Dang | G06F 16/904 |
| | | | 715/764 |
| 2010/0304858 A1* | 12/2010 | Asuke | A63F 13/428 |
| | | | 463/31 |
| 2014/0282157 A1* | 9/2014 | Glueck | G06F 3/04847 |
| | | | 715/767 |
| 2014/0313205 A1* | 10/2014 | Huempel | G06T 11/206 |
| | | | 345/440 |
| 2015/0058755 A1 | 2/2015 | Duncker et al. | |
| 2016/0098176 A1* | 4/2016 | Cervelli | G06F 3/04847 |
| | | | 715/804 |
| 2017/0212668 A1* | 7/2017 | Shah | G06F 3/0486 |
| 2019/0213763 A1* | 7/2019 | Geller | G06F 16/9024 |

OTHER PUBLICATIONS

Álvarez De Miguel, S. et al., "Identification model and PI and PID controller design for a novel electric air heater," Automatika, 58(1), 55-68, (Jul. 2017).

Extended European Search Report dated Oct. 23, 2023 for EP Application No. 23170616, 9 page(s).

\* cited by examiner

AUTOMATICALLY SCALING TREND CHART GRAPHICAL DISPLAY GENERATION IN A TOXIC GAS MONITORING SYSTEM

FIELD OF THE INVENTION

Example embodiments of the present disclosure relate generally to the fields of networked computerized industrial control, automation systems, and in particular, systems and methods that convey the trend of data values over time.

BACKGROUND

Typical industrial processes are extremely complex and receive substantially greater volumes of information than any human could possibly digest in its raw form. By way of example, it is not unheard of to have millions of sensor readings from toxic gas monitoring systems. Applicant has identified many technical challenges and difficulties associated with processing and rendering large volumes of data.

BRIEF SUMMARY

Various embodiments described herein relate to methods, apparatuses, and systems for chart rendering optimization.

In accordance with various embodiments of the present disclosure, an apparatus for generating chart visualizations is provided. In some embodiments, the apparatus comprises at least one processor and at least one non-transitory memory comprising program code. In some embodiments, the at least one non-transitory memory and the program code are configured to, with the at least one processor, cause the apparatus to at least: cause rendering of a gas concentration trend chart user interface on a display, wherein the gas concentration trend chart user interface comprises a gas concentration data point graphic section configured to display a first data set in an hourly mode, a left graphic slider user interface element, and a right graphic slider user interface element. The at least one non-transitory memory and the program code are further configured to, with the processor, cause the apparatus to receive, via the gas concentration trend chart user interface, a first user interaction input causing a reduced graphic distance between the left graphic slider user interface element and the right graphic slider user interface element. The at least one non-transitory memory and the program code are further configured to, with the processor, cause the apparatus to, in response to receiving the first user interaction input, identify the reduced graphic distance on the gas concentration trend chart user interface, determine that the reduced graphic distance satisfies a minute mode triggering distance threshold, and in response to determining that the reduced graphic distance satisfies the minute mode triggering distance threshold, cause the gas concentration data point graphic section to display a second data set in a minute mode.

In some embodiments, the at least one non-transitory memory and the computer program code may be further configured to, with the processor, cause the apparatus to receive, via the gas concentration trend chart user interface, a second user interaction input causing an increased graphic distance between the left graphic slider user interface element and the right graphic slider user interface element, and in response to receiving the second user interaction input, identify the increased graphic distance between the left graphic slider user interface element and the right graphic slider user interface element on the gas concentration trend chart user interface, and determine that the increased graphic distance satisfies an hourly mode triggering distance threshold, and in response to determining that the increased graphic distance satisfies the hourly mode triggering distance threshold, cause the gas concentration data point graphic section to display the first data set in the hourly mode.

In some embodiments, the gas concentration data point graphic section may be further configured to display a given time window between the left graphic slider user interface element and the right graphic slider user interface element, wherein the given time window representative of a time of interest. In some embodiments, the left graphic slider user interface element may be representative of a start time of the given time window. In some embodiments, the right graphic slider user interface element may be representative of an end time of the given time window. In some embodiments, the at least one non-transitory memory and the computer program code may be further configured to, with the processor, cause the apparatus to cause the gas concentration data point graphic section to display the first data set in hour resolution during the hourly mode.

In some embodiments, the at least one non-transitory memory and the computer program code may be further configured to, with the processor, cause the apparatus to cause the gas concentration data point graphic section to display the second data set in minute resolution during the minute mode. In some embodiments, at least one non-transitory memory and the computer program code may be further configured to, with the processor, cause the apparatus to cause the gas concentration data point graphic section to display a plurality of hour data points in the hourly mode, wherein each of the hour data points represents a maximum value in a given hour. In some embodiments, the at least one non-transitory memory and the computer program code may be further configured to, with the processor, cause the apparatus to cause the gas concentration data point graphic section to display a plurality of minute data points in the minute mode, wherein each of the minute data points represents a maximum value in a given minute. In some embodiments, the first data set may comprise data representative of a collection of data samples for a month period. In some embodiments, the second data set may comprise data representative of a collection of data samples for a 24-hour period.

In accordance with various embodiments of the present disclosure, an example computer-implemented method for generating chart visualizations is provided. In some embodiments, the example computer-implemented method comprises causing, by a computing device, rendering of a gas concentration trend chart user interface on a display, wherein the gas concentration trend chart user interface comprises a gas concentration data point graphic section configured to display a first data set in an hourly mode, a left graphic slider user interface element, and a right graphic slider user interface element. The method further comprises receiving, by the computing device via the gas concentration trend chart user interface, a first user interaction input causing a reduced graphic distance between the left graphic slider user interface element and the right graphic slider user interface element. The method further comprises in response to receiving the first user interaction input, identifying, by the computing device, the reduced graphic distance on the gas concentration trend chart user interface. The method further comprises determining, by the computing device, that the reduced graphic distance satisfies a minute mode triggering distance threshold, and in response to determining that the reduced graphic distance satisfies the minute mode triggering distance threshold, causing, by the computing device, the gas concentration data point graphic section to display a second data set in a minute mode.

In some embodiments, the computer-implemented method further comprises receiving, via the gas concentration trend chart user interface, a second user interaction input causing an increased graphic distance between the left graphic slider user interface element and the right graphic slider user interface element, and in response to receiving the second user interaction input, identifying the increased graphic distance between the left graphic slider user interface element and the right graphic slider user interface element on the gas concentration trend chart user interface, and determining that the increased graphic distance satisfies an hourly mode triggering distance threshold, and in response to determining that the increased graphic distance satisfies the hourly mode triggering distance threshold, causing the gas concentration data point graphic section to display the first data set in the hourly mode.

In some embodiments, the computer-implemented method may further comprise displaying a given time window between the left graphic slider user interface element and the right graphic slider user interface element, the given time window representative of a time of interest. In some embodiments, the left graphic slider user interface element may be representative of a start time of the given time window, and the right graphic slider user interface element may be representative of an end time of the given time window. In some embodiments, the computer-implemented method may further comprise causing the gas concentration data point graphic section to display the first data set in hour resolution during the hourly mode. In some embodiments, the computer-implemented method may further comprise causing the gas concentration data point graphic section to display the second data set in minute resolution during the minute mode. In some embodiments, the computer-implemented method may further comprise causing the gas concentration data point graphic section to display a plurality of hour data points in the hourly mode, wherein each of the hour data points represents a maximum value in a given hour. In some embodiments, the computer-implemented method may further comprise causing the gas concentration data point graphic section to display a plurality of minute data points in the minute mode, wherein each of the minute data points represents a maximum value in a given minute.

In accordance with various embodiments of the present disclosure, a computer program product for generating chart visualizations is provided. In some embodiments, the computer program product comprises at least one non-transitory computer-readable storage medium having computer-readable program code portions stored therein. In some embodiments, the computer-readable program code portions comprise an executable portion configured to cause rendering of a gas concentration trend chart user interface on a display, wherein the gas concentration trend chart user interface comprises a gas concentration data point graphic section configured to display a first data set in an hourly mode, a left graphic slider user interface element, and a right graphic slider user interface element.

The computer-readable program code portions may further comprise an executable portion configured to receive, via the gas concentration trend chart user interface, a first user interaction input causing a reduced graphic distance between the left graphic slider user interface element and the right graphic slider user interface element, and in response to receiving the first user interaction input, identify the reduced graphic distance on the gas concentration trend chart user interface. The computer-readable program code portions may further comprise an executable portion configured to determine that the reduced graphic distance satisfies a minute mode triggering distance threshold, and in response to determining that the reduced graphic distance satisfies the minute mode triggering distance threshold, cause the gas concentration data point graphic section to display a second data set in a minute mode.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
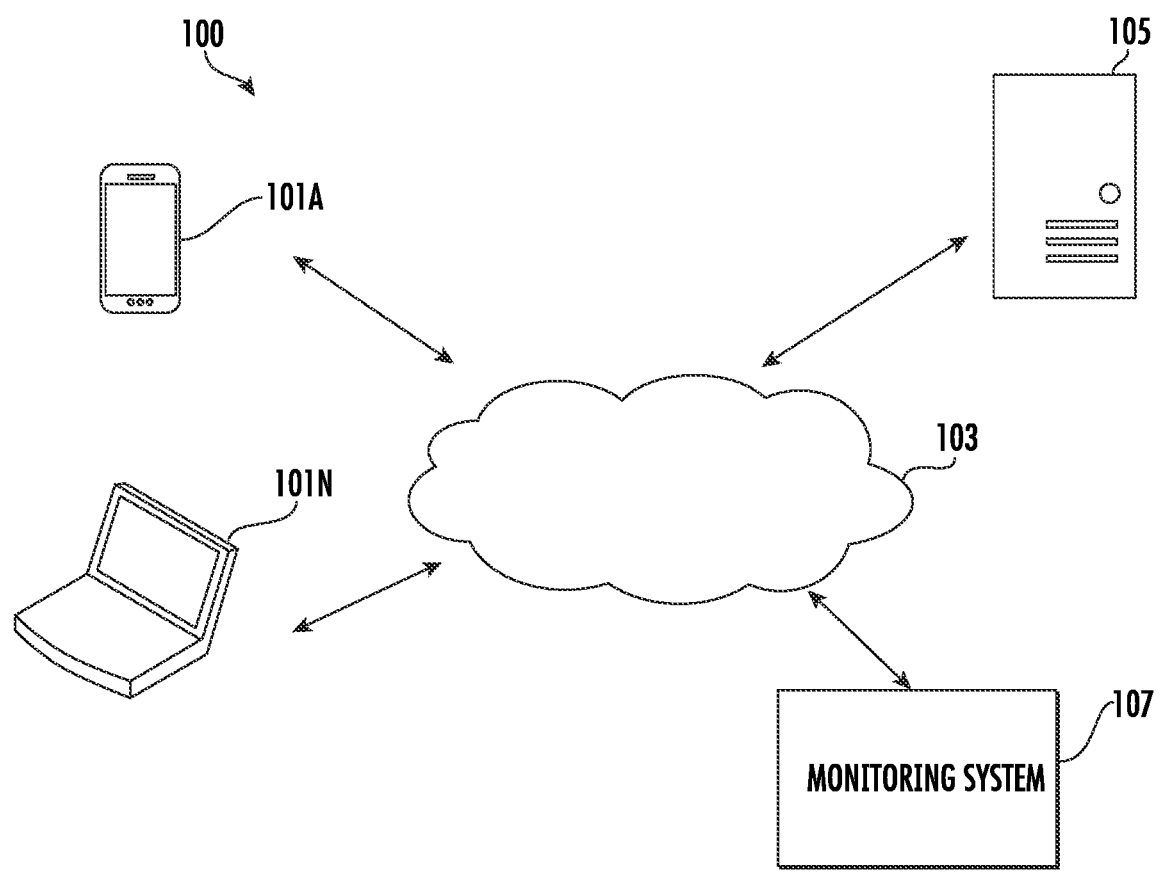
FIG. 1 illustrates an example analytics system in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As described above, there are many technical challenges and difficulties associated with processing and rendering large volumes of data. Analytical applications may render data in a chart, such as for analysis by a user. The time to render a chart may depend on the amount of data to be shown in the chart. The time needed to obtain the data from a data source, the time to render the data in the chart, or both may be significant. Additionally, rendering large volumes of data may consume excessive computing bandwidth. Further, rendering of large numbers of data points can result in the bulk of the data points being obscured.

As an example, a multi-point toxic gas monitoring system may be configured to record and render up to 30 days' worth of data in a gas concentration trend chart. The multi-point toxic gas monitoring system may sample and record data at a rate of once per second for each of a plurality of monitoring channels. Due to the high number of data points, response time of presenting the data on a graphical user interface (GUI) can be very high. For example, chart rendering operations, such as choosing a channel to view, changing a display range on a channel, and switching channels, may take tens of seconds or even a minute for each channel (for example, 2,592,000 data points potentially). Accordingly, such lengthy rendering times lead to poor user experience and reduce useability.

Furthermore, it is technically challenging for graphical user interfaces to provide users an efficient way to dynamically scale charts. Chart scaling may refer to how far apart the values are on a given axis of a chart. For example, a user interested in viewing an overall trend of a chart may want to view more minute details (narrower sample point resolution) if there is an event that may concern the user. There is a need to effectively display various resolutions of data on a user interface to give more information to a customer.

In contrast, various example embodiments of the present disclosure overcome such technical challenges and difficulties in data processing and rendering, and provide various technical advancements and improvements. In accordance with various examples of the present disclosure, systems and methods for processing data samples and generating chart visualizations based on the processed data samples are disclosed. An exemplary system may perform user interface generation operations that reduce rendering time and CPU bandwidth consumption of a data set to a graphical user interface (GUI) and allow users to view overall data trend as well as event details as desired.

Referring now to FIG. 1, an example diagram illustrating an example analytics system 100 in accordance with some example embodiments described herein is provided. As shown in FIG. 1, the example analytics system 100 may comprise apparatuses, devices, and components such as, but not limited to, a monitoring system 107, one or more client computing devices 101A . . . 101N, a remote computing server 105 in a remote computing platform, and one or more networks 103.

In some embodiments, each of the components of the example analytics platform 100 may be in electronic communication with, for example, one another over the same or different wireless or wired networks 103 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

For example, the monitoring system 107, one or more client computing devices 101A . . . 101N, the remote computing server 105 in the remote computing platform may be in electronic communication with one another to exchange data and information. As described herein, the monitoring system 107 may receive one or more samples (such as, but not limited to, air, gases, liquids, and any other types of fluids) from one or more sampling sources and may comprise one or more analyzer modules coupled to one or more processor devices that generate data associated with the sampling sources. Examples of analyzer modules may include, but not limited to, pyrolyzer modules, Chemcassette® modules, and/or other modules that provide physical evidence of a gas event. Such an analyzer module may comprise mechanical and electronic components that are configured to react or process certain gases, and generate sample data.

In some embodiments, the monitoring system 107 may transmit sample data from the one or more sampling sources to the one or more client computing devices 101A . . . 101N and/or the remote computing server 105 in the remote computing platform for analysis. Sample data from the one or more sampling sources may be distributed into individual monitoring channels corresponding to each of the sampling sources.

In some embodiments, the one or more client computing devices 101A . . . 101N and/or the remote computing server 105 in the remote computing platform may receive the sample data from the monitoring system 107, and may generate estimated sample characteristics data associated with the sample data based at least in part on the data. Examples of estimated sample characteristics data may include, but not limited to, gas concentration. For example, the analyzer modules of the monitoring system 107 may transmit sample data to the one or more client computing devices 101A . . . 101N and/or the remote computing server 105. Upon receiving the sample data, the one or more client computing devices 101A . . . 101N and/or the remote computing server 105 may render the estimated sample characteristics data associated with the sample data on a GUI.

In some embodiments, the one or more client computing devices 101A . . . 101N and/or the remote computing server 105 may generate one or more data points on a GUI based on the data in accordance with various example methods described herein, including, but not limited to, those described in connection with at least FIG. 4 and FIG. 7. In particular, the one or more client computing devices 101A . . . 101N and/or the remote computing server 105 in accordance with some embodiments of the present disclosure reduce rendering time of a data set to a GUI and allow users to view overall data trend as well as event details as desired.

Figure 2:
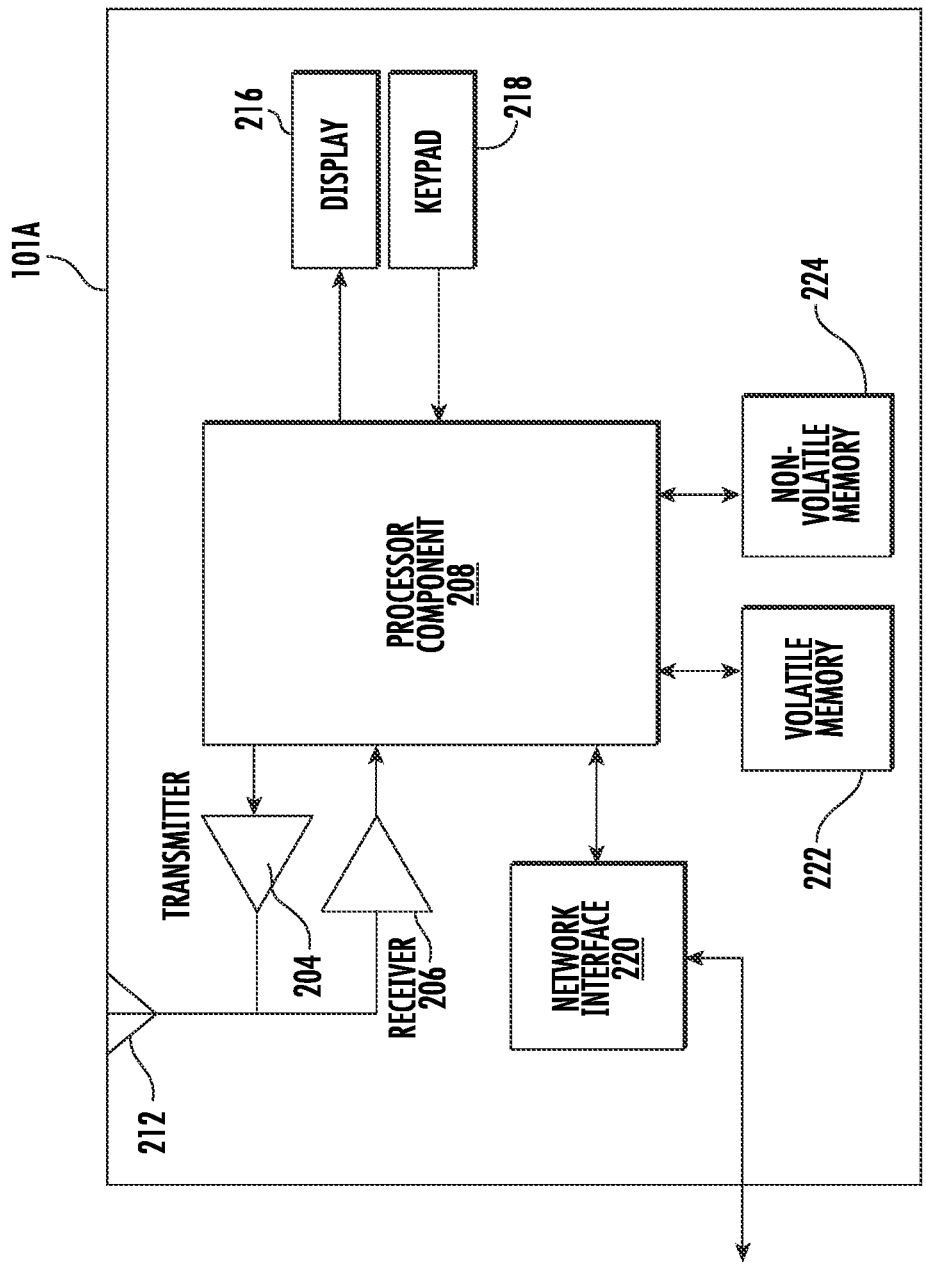
FIG. 2 is an example schematic representation of an example client computing device in accordance with some example embodiments described herein.

Referring now to FIG. 2, an example schematic representation of an example client computing device in accordance with some example embodiments described herein is provided. For example, FIG. 2 provides an illustrative schematic representative of one of the client computing devices 101A to 101N that can be used in conjunction with embodiments of the present disclosure. In some embodiments, the client computing device 101A can include an antenna 212, a transmitter 204 (e.g., radio), a receiver 206 (e.g., radio), and a processor component 208 that provides signals to and receives signals from the transmitter 204 and receiver 206, respectively. The signals provided to and received from the transmitter 204 and the receiver 206, respectively, may include signaling information/data in accordance with an air interface standard of applicable wireless systems to communicate with various entities, such as a remote computing server 105, another client computing device 101A, an example monitoring system and/or the like. In this regard, the client computing device 101A may be capable of operating with one or more air interface standards, communication protocols, modulation types, and access types. More particularly, the client computing device 101A may comprise a network interface 220, and may operate in accordance with any of a number of wireless communication standards and protocols. In a particular embodiment, the client computing device 101A may operate in accordance with multiple wireless communication standards and protocols, such as GPRS, UMTS, CDMA1900, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the client computing device 101A can communicate with various other entities using Unstructured Supplementary Service data (USSD), Short Message Service (SMS), Multimedia Messaging Service (MMS), Dual-Tone Multi-Frequency (DTMF) Signaling, Subscriber Identity Module Dialer (SIM dialer), and/or the like. The client computing device 101A can also download changes, add-ons, and updates, for instance, to its firmware, software (e.g., including executable instructions, applications, program modules), and operating system.

The client computing device 101A may also comprise a user interface comprising one or more user input/output interfaces (e.g., a display 216 and/or speaker/speaker driver coupled to a processor component 208 and a touch screen, keyboard, mouse, and/or microphone coupled to a processor component 208). For example, the user output interface may be configured to provide an application, browser, user interface, dashboard, webpage, and/or similar words used herein interchangeably executing on and/or accessible via the client computing device 101A to cause display or audible presentation of information/data and for user interaction therewith via one or more user input interfaces. The user output interface may be updated dynamically from communication with the remote computing server 105. The user input interface can comprise any of a number of devices allowing the client computing device 101A to receive data, such as a keypad 218 (hard or soft), a touch display, voice/speech or motion interfaces, scanners, readers, or other input device. In embodiments including a keypad 218, the keypad 218 can include (or cause display of) the conventional numeric (0-9) and related keys (#, *), and other keys used for operating the client computing device 101A and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the client computing device 101A can collect information/data, user interaction/input, and/or the like.

The client computing device 101A can also include volatile storage or memory 222 and/or non-volatile storage or memory 224, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client computing device 101A-101N.

Figure 3:
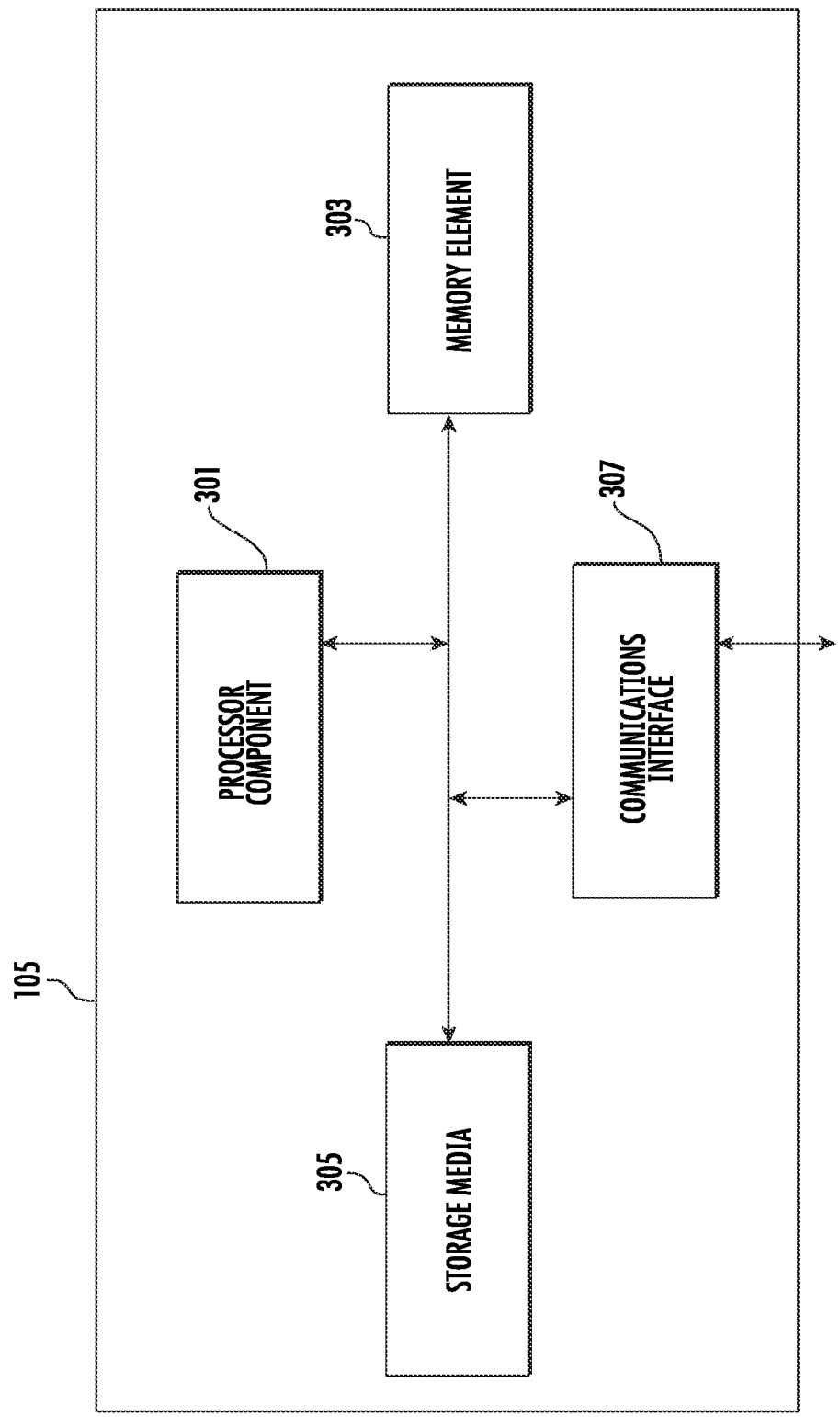
FIG. 3 is an example schematic representation of an example remote computing server of an example remote computing platform in accordance with some example embodiments described herein.

Referring now to FIG. 3, an example schematic representation of an example remote computing server 105 in an example remote computing platform in accordance with some example embodiments described herein. In some embodiments, the example remote computing platform may be a cloud computing platform, and the example remote computing server may be a cloud computing server.

As indicated, in some embodiments, the remote computing server 105 may include one or more network and/or communications interface 307 for communicating with various computing entities, such as by communicating data, content, information, and/or similar terms used herein that can be transmitted, received, operated on, processed, displayed, stored, and/or the like. For instance, the remote computing server 105 may communicate with monitoring system 107, one or more client computing devices 101A . . . 101N, and/or the like.

As shown in FIG. 3, in one embodiment, the remote computing server 105 may include or be in communication with one or more processor components (for example, processor component 301) (also referred to as processor components, processing circuitry, and/or similar terms used herein interchangeably) that communicate with other elements within the remote computing server 105 via a bus, for example, or network connection. As will be understood, the processor component 301 may be embodied in a number of different ways. For example, the processor component 301 may be embodied as one or more complex programmable logic devices (CPLDs), microprocessor components, multi-core processor components, co-processing entities, application-specific instruction-set processor components (ASIPs), and/or controllers. Further, the processor component 301 may be embodied as one or more other processing devices or circuitry. The term circuitry may refer to an entirely hardware embodiment or a combination of hardware and computer program products. Thus, the processor component 301 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor component 301 may be configured for a particular use or configured to execute instructions stored in volatile or non-volatile media or otherwise accessible to the processor component 301. As such, whether configured by hardware or computer program products, or by a combination thereof, the processor component 301 may be capable of performing steps or operations according to embodiments of the present disclosure when configured accordingly.

In one embodiment, the remote computing server 105 may further include or be in communication with volatile media (also referred to as volatile storage, memory, memory storage, memory circuitry and/or similar terms used herein interchangeably). In one embodiment, the volatile storage or memory may also include one or more memory element 303 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 303 may be used to store at least portions of the databases, database instances, database management system entities, data, applications, programs, program modules, scripts, source code, object code, byte code, compiled code, interpreted code, machine code, executable instructions, and/or the like being executed by, for example, the processor component 301 as shown in FIG. 3. Thus, the databases, database instances, database management system entities, data, applications, programs, program modules, scripts, source code, object code, byte code, compiled code, interpreted code, machine code, executable instructions, and/or the like may be used to control certain aspects of the operation of the remote computing server 105 with the assistance of the processor component 301 and operating system.

In one embodiment, the remote computing server 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 305 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 305 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 305 may also be embodied as a data storage device or devices, as a separate database server or servers, or as a combination of data storage devices and separate database servers. Further, in some embodiments, storage media 305 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery prediction system may be stored.

As indicated, in one embodiment, the remote computing server 105 may also include one or more network and/or communications interface 307 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the remote computing server 105 may be configured to communicate via wireless external communication networks using any of a variety of protocols, such as general packet radio service (GPRS), Universal Mobile Telecommunications System (UMTS), Code Division Multiple Access 1900 (CDMA1900), CDMA1900 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), Institute of Electrical and Electronics Engineers (IEEE) 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The remote computing server 105 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the remote computing server's components may be located remotely from components of other remote computing servers, such as in a distributed system. Furthermore, one or more of the components may be aggregated and additional components performing functions described herein may be included in the remote computing server 105. Thus, the remote computing server 105 can be adapted to accommodate a variety of needs and circumstances.

Figure 4:
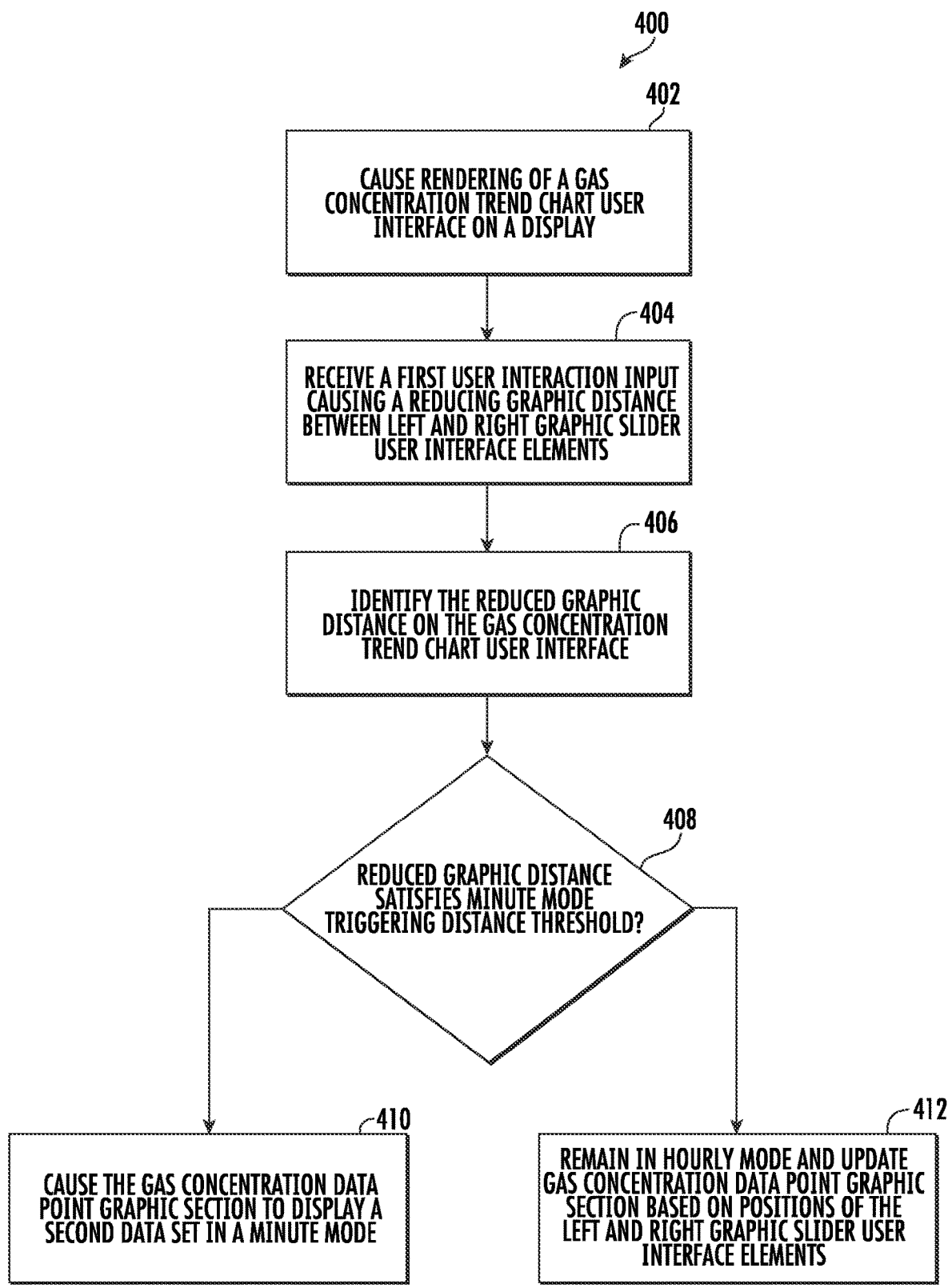
FIG. 4 is an example flow diagram illustrating an example method for generating chart visualizations in accordance with some example embodiments described herein.
Figure 7:
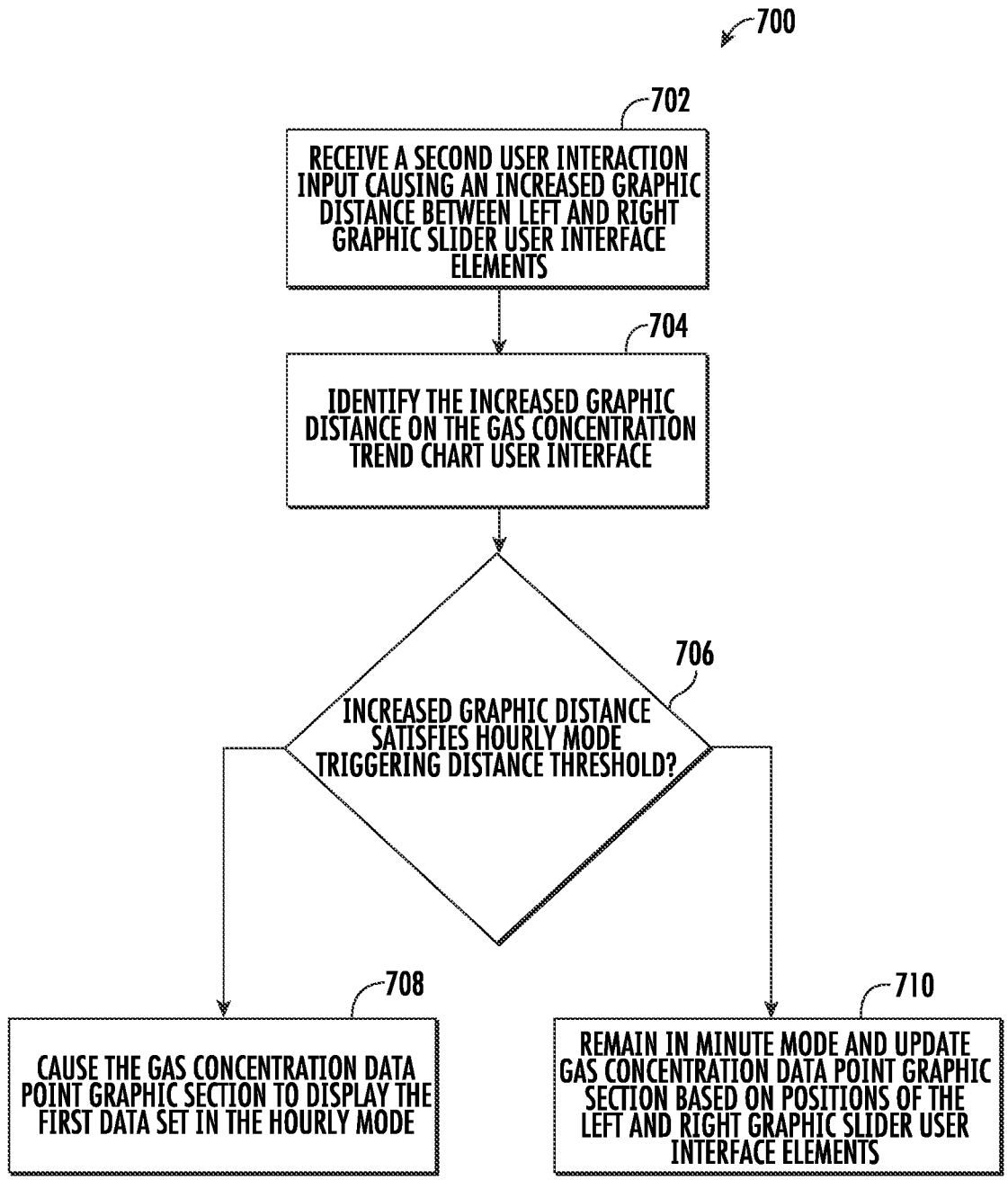
FIG. 7 is an example flow diagram illustrating an example method for generating chart visualizations in accordance with some example embodiments described herein.

Referring now to FIG. 4 and FIG. 7, example flow diagrams illustrating example methods of generating chart visualizations in accordance with some example embodiments of the present disclosure are provided. It is noted that each block of the flowchart, and combinations of blocks in the flowchart, may be implemented by various means such as hardware, firmware, circuitry and/or other devices associated with execution of software including one or more computer program instructions. For example, one or more of the steps/operations described in FIG. 4 and FIG. 7 may be embodied by computer program instructions, which may be stored by a non-transitory memory of an apparatus employing an embodiment of the present disclosure and executed by a processor component in an apparatus (such as, but not limited to, a monitoring system, a client computing device, a remote computing server, and/or the like). For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 5:
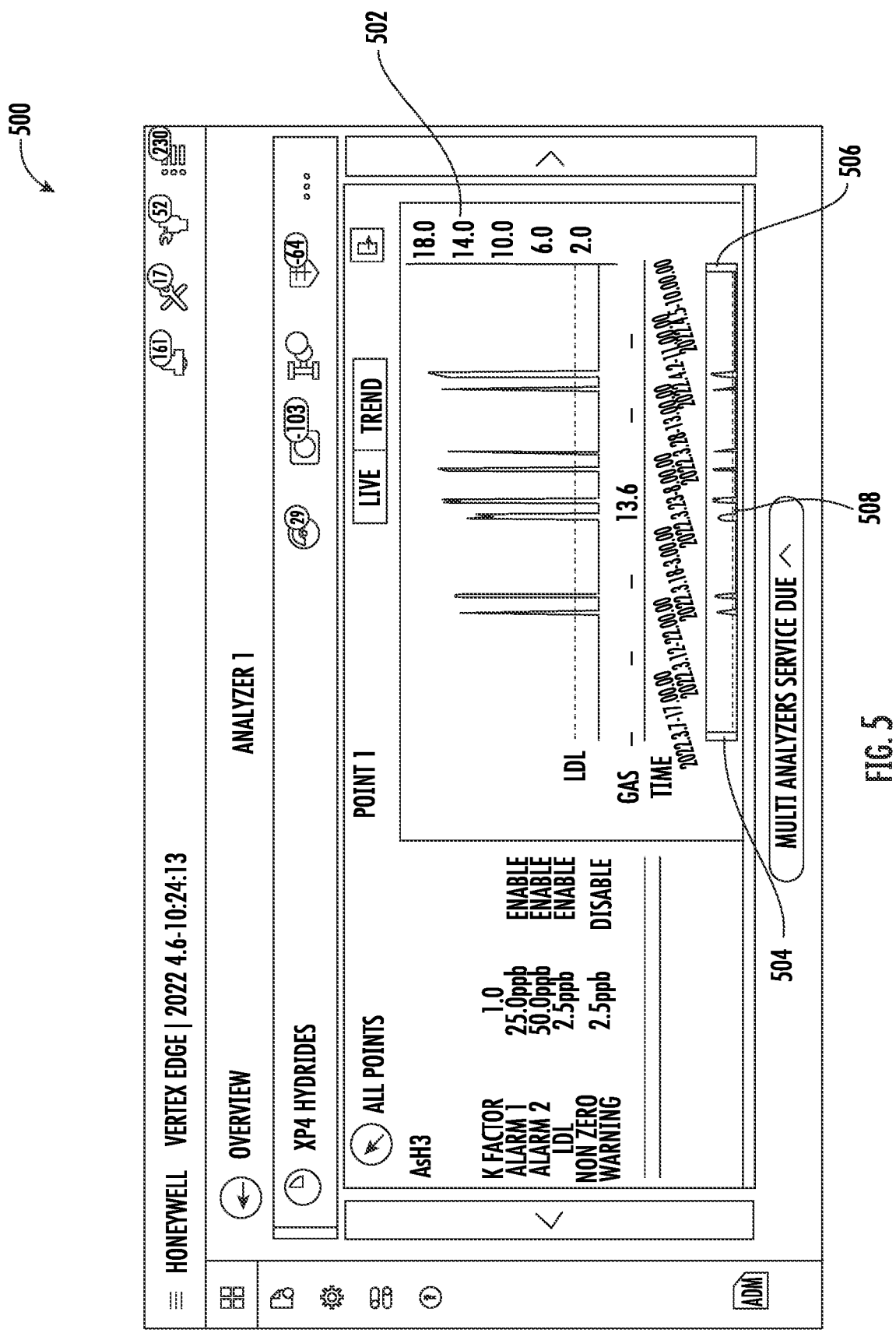
FIG. 5 and FIG. 6 are exemplary gas concentration trend chart user interfaces in accordance with some example embodiments described herein.

Referring now to FIG. 4, an example method 400 of generating chart visualizations in accordance with some example embodiments described herein is illustrated. At step 402, a computing device (such as, but not limited to, the one or more client computing devices 101A . . . 101N and/or the remote computing server 105 described above in connection with FIG. 1, FIG. 2, and/or FIG. 3) causes rendering of a gas concentration trend chart user interface on a display. An exemplary gas concentration trend chart user interface is depicted in FIG. 5. A gas concentration trend chart user interface 500 comprises a gas concentration data point graphic section 502 configured to display a first data set in an hourly mode, a left graphic slider user interface element 504, and a right graphic slider user interface element 506. In some embodiments, the first data set may comprise a portion of an entirety of sample data, for example, generated from monitoring system 107. As an example, monitoring system 107 may retrieve and record sample data at a rate of once per second for each of a plurality of monitoring channels. Accordingly, the first data set may comprise a subset of the sample data.

In some embodiments, the first data set may comprise data points, where each data point is representative of a maximum value of the sample data for a given hour for a given monitoring channel. In the hourly mode, the first data set may be rendered as points in the gas concentration data point graphic section 502 in hourly increments or hourly resolution comprising data points representative of a maximum value of sample data for a given hour. That is, instead of rendering data at a scale corresponding to the sampling rate of the sample data (e.g., once per second), the hourly mode may provide a user with a view of an overall trend over a larger time frame. For example, up to 30 days of sample data may be displayed in the hourly mode. The hourly mode may include data points representative of a maximum value in a given hour and may reduce the total data points down to 720 for a 30-day period. According to one embodiment, the hourly mode may comprise a rendering of data for a duration of time, such as a month, week, or a plurality of days without having to render the entirety of the sample data.

In some embodiments, subsequent to step 402, the example method proceeds to step 404, where a first user interaction input causing a reduced graphic distance between the left graphic slider user interface element and the right graphic slider user interface element is received via the gas concentration trend chart user interface and by the computing device (such as, but not limited to, the one or more client computing devices 101A . . . 101N and/or the remote computing server 105 described above in connection with FIG. 1, FIG. 2, and/or FIG. 3). According to some embodiments, the positions of the left graphic slider user interface element and the right graphic slider user interface element are configurable.

In the example illustrated in FIG. 5, the left graphic slider user interface element 504 represents a start time of a given time window 508 and the right graphic slider user interface element 506 represents an end time of the given time window 508. The first user interaction input may comprise a user selection of the left graphic slider user interface element 504 and/or the right graphic slider user interface element 506 being moved towards each other, resulting in a reduced graphic distance between them. For example, in the hourly mode, a user may use the sliders to choose a time window of interest. The right graphic slider user interface element 506 may be moved to a desired end time and the left graphic slider user interface element 504 may be moved to a desired start time towards the right graphic slider user interface element 506.

In some embodiments, subsequent to step 404, the example method proceeds to step 406, where in response to receiving the first user interaction input, the reduced graphic distance on the gas concentration trend chart user interface is identified by the computing device (such as, but not limited to, the one or more client computing devices 101A . . . 101N and/or the remote computing server 105 described above in connection with FIG. 1, FIG. 2, and/or FIG. 3). The left graphic slider user interface element 504 and the right graphic slider user interface element 506 may be moved to select a time range of interest by adjusting the given time window 508. Reducing the graphic distance between the left graphic slider user interface element 504 and the right graphic slider user interface element 506 may decrease a range of data points from the first data set to be displayed in the gas concentration data point graphic section 502.

In some embodiments, subsequent to step 406, the example method proceeds to step 408, where the reduced graphic distance is determined to satisfy a minute mode triggering distance threshold. For example, if the graphic distance between the left graphic slider user interface element 504 and the right graphic slider user interface element 506 is reduced to less than or equal to a given threshold value representative of a minute threshold time window, the reduced graphic distance is determined to satisfy a minute mode triggering distance threshold. If the graphic distance between the left graphic slider user interface element 504 and the right graphic slider user interface element 506 is reduced not less than or equal to a given threshold value representative of a minute threshold time window, then the reduced graphic distance is determined to not satisfy the minute mode triggering distance threshold. The given threshold may comprise a condition for triggering switch of display from the first data set in hourly mode to display of a second data set in minute mode. For example, the minute mode triggering distance threshold may be 2 centimeters, intervals, or spaces on the GUI. Additionally, or alternatively, the minute mode triggering distance threshold may be other values.

Figure 6:
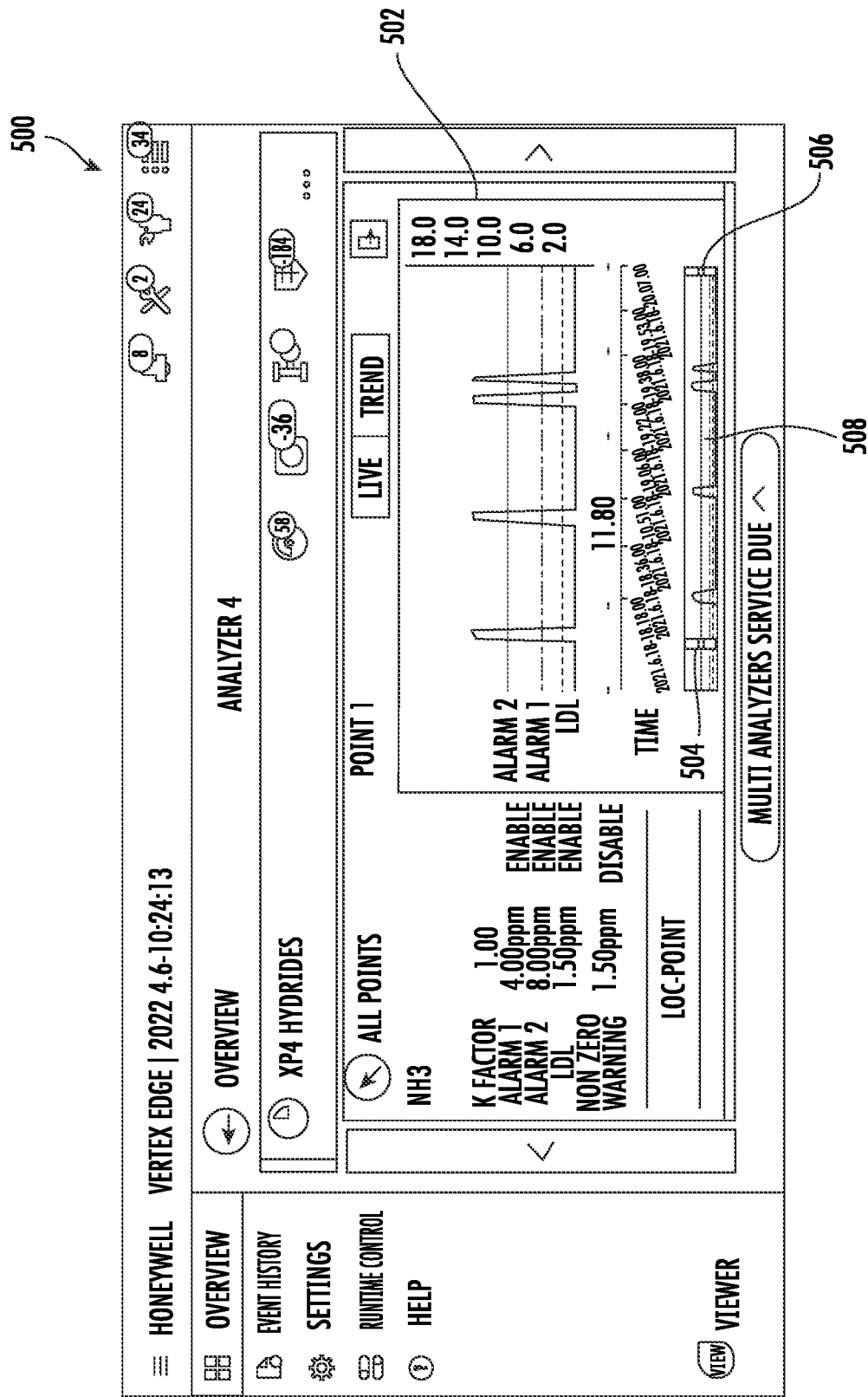

In some embodiments, subsequent to step 408, the example method proceeds to step 410, where in response to determining that the reduced graphic distance satisfies the minute mode triggering distance threshold, the gas concentration data point graphic section is caused to display a second data set in a minute mode. In some embodiments, the second data set may comprise a portion of the entirety of the sample data associated with the first data set. For example, the second data set may comprise data points, where each data point is representative of a maximum value of the sample data for a given minute corresponding to certain hours associated with the first data set. As depicted in FIG. 6, the second data set may be rendered as points in the gas concentration data point graphic section 502 in minute increments or minute resolution comprising data points representative of a maximum value of sample data for a given minute.

According to one embodiment, the minute mode may comprise a rendering of data for a duration of time, such as a day, or a plurality of hours without having to render the entirety of the sample data. Additionally, in contrast to the hourly scale, the minute mode may provide a user with a more detailed view in a minute scale over a smaller time frame. For example, up to 24 hours of sample data may be displayed in the minute mode. The minute mode may include data points representative of a maximum value in a given minute and may reduce the total data points down to 1,440 for a 24-hour period. In some embodiments, a user can use the left graphic slider user interface element 504 and the right graphic slider user interface element 506 to choose a time window of interest and generate a detailed report that includes all the sample data in one-per-minute intervals.

As illustrated in the example shown in FIG. 6, various example embodiments of the present disclosure provide various technical benefits and advantages. For example, rendering of reduced total data points in the hourly and minute modes allow users to view overall data trend and switch to event details as desired. By the reducing the total data points, the time needed to render the sample data from hourly mode to minute mode may also be reduced. Furthermore, reduced total data points may also reduce computing bandwidth consumption.

In some embodiments, subsequent to step 408, the example method proceeds to step 412, where in response to determining that the reduced graphic distance does not satisfy the minute mode triggering distance threshold, the gas concentration data point graphic section remains in hourly mode and is updated based on positions of the left graphic slider user interface element 504 and the right graphic slider user interface element 506. For example, data points displayed in the gas concentration data point graphic section may reflect data points corresponding to hours in a time window bounded by the left graphic slider user interface element 504 and the right graphic slider user interface element 506.

Referring now to FIG. 7, an example method 400 of generating chart visualizations in accordance with some example embodiments described herein is illustrated. The gas concentration data point graphic section 502 may be reverted from the minute mode to the hourly mode. At step 702, a second user interaction input causing an increased graphic distance between the left graphic slider user interface element and the right graphic slider user interface element is received via the gas concentration trend chart user interface and by the computing device (such as, but not limited to, the one or more client computing devices 101A . . . 101N and/or the remote computing server 105 described above in connection with FIG. 1, FIG. 2, and/or FIG. 3). The second user interaction input may comprise a user selection of the left graphic slider user interface element 504 and/or the right graphic slider user interface element 506 being moved away from each other, resulting in an increased graphic distance between them. For example, left graphic slider user interface element 504 may be moved to the left and the right graphic slider user interface element 506 may be moved to the right.

In some embodiments, subsequent to step 702, the example method proceeds to step 704, where in response to receiving the second user interaction input, the increased graphic distance between the left graphic slider user interface element and the right graphic slider user interface element on the gas concentration trend chart user interface is identified by the computing device (such as, but not limited to, the one or more client computing devices 101A . . . 101N and/or the remote computing server 105 described above in connection with FIG. 1, FIG. 2, and/or FIG. 3). The left graphic slider user interface element 504 and the right graphic slider user interface element 506 may be moved to select a time range of interest by adjusting the given time window 508. Increasing the graphic distance between the left graphic slider user interface element 504 and the right graphic slider user interface element 506 may increase a range of data points that is beyond the second data set to be displayed in the gas concentration data point graphic section 502.

In some embodiments, subsequent to step 704, the example method proceeds to step 706, where the increased graphic distance is determined to satisfy an hourly mode triggering distance threshold. For example, if the graphic distance between the left graphic slider user interface element 504 and the right graphic slider user interface element 506 is increased to more than or equal to a given threshold representative of an hour threshold time window, then the increased distance is determined to satisfy an hourly mode triggering threshold. If graphic distance between the left graphic slider user interface element 504 and the right graphic slider user interface element 506 is increased not more than or equal to the given threshold value representative of an hour threshold time window, then the increased graphic distance is determined to not satisfy the hourly mode triggering distance threshold.

The given threshold may comprise a condition for triggering switch of display from the second data set in minute mode to display of the first data set in hourly mode. In some embodiments, when the left graphic slider user interface element 504 is moved to the leftmost position on the given time window 508 and the right graphic slider user interface element 506 is moved to the rightmost position on the given time window 508, the increased graphic distance satisfies the hourly mode triggering distance threshold. When the left graphic slider user interface element 504 is not moved to the leftmost position on the given time window 508 and/or the right graphic slider user interface element 506 is not moved to the rightmost position on the given time window 508, the increased graphic distance does not satisfy the hourly mode triggering distance threshold.

In some embodiments, subsequent to step 706, the example method proceeds to step 708, where in response to determining that the increased graphic distance satisfies the hourly mode triggering distance threshold, cause the gas concentration data point graphic section to display the first data set in the hourly mode. The gas concentration data point graphic section 502 may be reverted from displaying the second data set in the minute mode to displaying the first data set in the hourly mode. In some embodiments, a user can use the left graphic slider user interface element 504 and the right graphic slider user interface element 506 to choose a time window of interest and generate a detailed report that includes all the sample data in one-per-hour intervals.

As illustrated in the example shown in FIG. 7, various example embodiments of the present disclosure provide various technical benefits and advantages. For example, rendering of reduced total data points in the minute and hourly modes allow users to view specific event details and switch to overall data trend as desired. Furthermore, by the reducing the total data points, the time needed to render the sample data when switching between minute mode to hourly mode may also be reduced. Reduced total data points may also reduce computing bandwidth consumption.

In some embodiments, subsequent to step 706, the example method proceeds to step 710, where in response to determining that the increased graphic distance does not satisfy the hourly mode triggering distance threshold, the gas concentration data point graphic section remains in minute mode and is updated based on positions of the left graphic slider user interface element 504 and the right graphic slider user interface element 506. For example, data points displayed in the gas concentration data point graphic section may reflect data points corresponding to minutes in a time window bounded by the left graphic slider user interface element 504 and the right graphic slider user interface element 506.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising a computer program code, the at least one non-transitory memory and the computer program code configured to, with the at least one processor, cause the apparatus to:
cause rendering of a gas concentration trend chart user interface on a display, wherein the gas concentration trend chart user interface comprises a gas concentration data point graphic section configured to display a first data set in an hourly mode, a left graphic slider user interface element, a right graphic slider user interface element, and a given time window between the left graphic slider user interface element and the right graphic slider user interface element, the given time window representative of a time of interest;
receive, via the gas concentration trend chart user interface, a first user interaction input causing a reduced graphic distance between the left graphic slider user interface element and the right graphic slider user interface element;
in response to receiving the first user interaction input, identify the reduced graphic distance on the gas concentration trend chart user interface;
determine that the reduced graphic distance satisfies a minute mode triggering distance threshold;
in response to determining that the reduced graphic distance satisfies the minute mode triggering distance threshold, cause the gas concentration data point graphic section to display a second data set in a minute mode, wherein displaying the second data set in the minute mode corresponds to displaying a data set that represents the first data set in a minute scale;
receive, via the gas concentration trend chart user interface, a second user interaction input that corresponds to each of movement of the left graphic slider user interface element to leftmost position of the given time window and movement of the right graphic slider user interface element to rightmost position of the given time window;
determine, based on the second user interaction input, that an increased graphic distance between the left graphic slider user interface element and the right graphic slider user interface element satisfies an hourly mode triggering distance threshold, wherein the hourly mode triggering distance threshold comprises a graphic distance between the left graphic slider user interface element at the leftmost position and the right graphic slider user interface element at the rightmost position; and
in response to determining that the increased graphic distance satisfies the hourly mode triggering distance threshold, cause the gas concentration data point graphic section to display the second data set in the hourly mode.

2. The apparatus of claim 1 wherein the left graphic slider user interface element is representative of a start time of the given time window.

3. The apparatus of claim 1 wherein the right graphic slider user interface element is representative of an end time of the given time window.

4. The apparatus of claim 1 wherein the at least one non-transitory memory and the computer program code are further configured to, with the processor, cause the apparatus to:
cause the gas concentration data point graphic section to display a plurality of hour data points in the hourly mode, wherein each of the hour data points represents a maximum value in a given hour.

5. The apparatus of claim 1 wherein the at least one non-transitory memory and the computer program code are further configured to, with the processor, cause the apparatus to:
cause the gas concentration data point graphic section to display a plurality of minute data points in the minute mode, wherein each of the minute data points represents a maximum value in a given minute.

6. The apparatus of claim 1 wherein the first data set comprises data representative of a collection of data samples for a month period.

7. The apparatus of claim 1 wherein the second data set comprises data representative of a collection of data samples for a 24-hour period.

8. A computer-implemented method comprising:
causing, by a computing device, rendering of a gas concentration trend chart user interface on a display, wherein the gas concentration trend chart user interface comprises a gas concentration data point graphic section configured to display a first data set in an hourly mode, a left graphic slider user interface element, a right graphic slider user interface element, and a given time window between the left graphic slider user interface element and the right graphic slider user interface element, the given time window representative of a time of interest;

receiving, by the computing device via the gas concentration trend chart user interface, a first user interaction input causing a reduced graphic distance between the left graphic slider user interface element and the right graphic slider user interface element;

in response to receiving the first user interaction input, identifying, by the computing device, the reduced graphic distance on the gas concentration trend chart user interface;

determining, by the computing device, that the reduced graphic distance satisfies a minute mode triggering distance threshold;

in response to determining that the reduced graphic distance satisfies the minute mode triggering distance threshold, causing, by the computing device, the gas concentration data point graphic section to display a second data set in a minute mode, wherein displaying the second data set in the minute mode corresponds to displaying a data set that represents the first data set in a minute scale;

receiving, by the computing device via the gas concentration trend chart user interface, a second user interaction input that corresponds to each of movement of the left graphic slider user interface element to leftmost position of the given time window and movement of the right graphic slider user interface element to rightmost position of the given time window;

determining, by the computing device, based on the second user interaction input, that an increased graphic distance between the left graphic slider user interface element and the right graphic slider user interface element satisfies an hourly mode triggering distance threshold, wherein the hourly mode triggering distance threshold comprises a graphic distance between the left graphic slider user interface element at the leftmost position and the right graphic slider user interface element at the rightmost position; and in response to determining that the increased graphic distance satisfies the hourly mode triggering distance threshold, causing, by the computing device, the gas concentration data point graphic section to display the second data set in the hourly mode.

9. The apparatus of claim 8 wherein the left graphic slider user interface element is representative of a start time of the given time window, and the right graphic slider user interface element is representative of an end time of the given time window.

10. The computer-implemented method of claim 8 further comprising:
causing the gas concentration data point graphic section to display a plurality of hour data points in the hourly mode, wherein each of the hour data points represents a maximum value in a given hour.

11. The computer-implemented method of claim 8 further comprising:
causing the gas concentration data point graphic section to display a plurality of minute data points in the minute mode, wherein each of the minute data points represents a maximum value in a given minute.

12. A computer program product comprising at least one non-transitory computer-readable storage medium having computer-readable program code portions stored therein, the computer-readable program code portions comprising an executable portion configured to:

cause rendering of a gas concentration trend chart user interface on a display, wherein the gas concentration trend chart user interface comprises a gas concentration data point graphic section configured to display a first data set in an hourly mode, a left graphic slider user interface element, a right graphic slider user interface element, and a given time window between the left graphic slider user interface element and the right graphic slider user interface element, the given time window representative of a time of interest;

receive, via the gas concentration trend chart user interface, a first user interaction input causing a reduced graphic distance between the left graphic slider user interface element and the right graphic slider user interface element;

in response to receiving the first user interaction input, identify the reduced graphic distance on the gas concentration trend chart user interface;

determine that the reduced graphic distance satisfies a minute mode triggering distance threshold;

in response to determining that the reduced graphic distance satisfies the minute mode triggering distance threshold, cause the gas concentration data point graphic section to display a second data set in a minute mode, wherein displaying the second data set in the minute mode corresponds to displaying a data set that represents the first data set in a minute scale;

receive, via the gas concentration trend chart user interface, a second user interaction input that corresponds to each of movement of the left graphic slider user interface element to leftmost position of the given time window and movement of the right graphic slider user interface element to rightmost position of the given time window;

determine, based on the second user interaction input, that an increased graphic distance between the left graphic slider user interface element and the right graphic slider user interface element satisfies an hourly mode triggering distance threshold, wherein the hourly mode triggering distance threshold comprises a graphic distance between the left graphic slider user interface element at the leftmost position and the right graphic slider user interface element at the rightmost position; and in response to determining that the increased graphic distance satisfies the hourly mode triggering distance threshold, cause the gas concentration data point graphic section to display the second data set in the hourly mode.

* * * * *